April 13, 1954     L. P. RANKIN ET AL     2,675,335
THERMOSETTING LAMINATING COMPOSITION FROM FORMALDEHYDE
CONDENSED WITH MIXTURE OF PHENOL, MONOBUTYL
PHENOL AND DIBUTYL PHENOL
Filed May 22, 1948
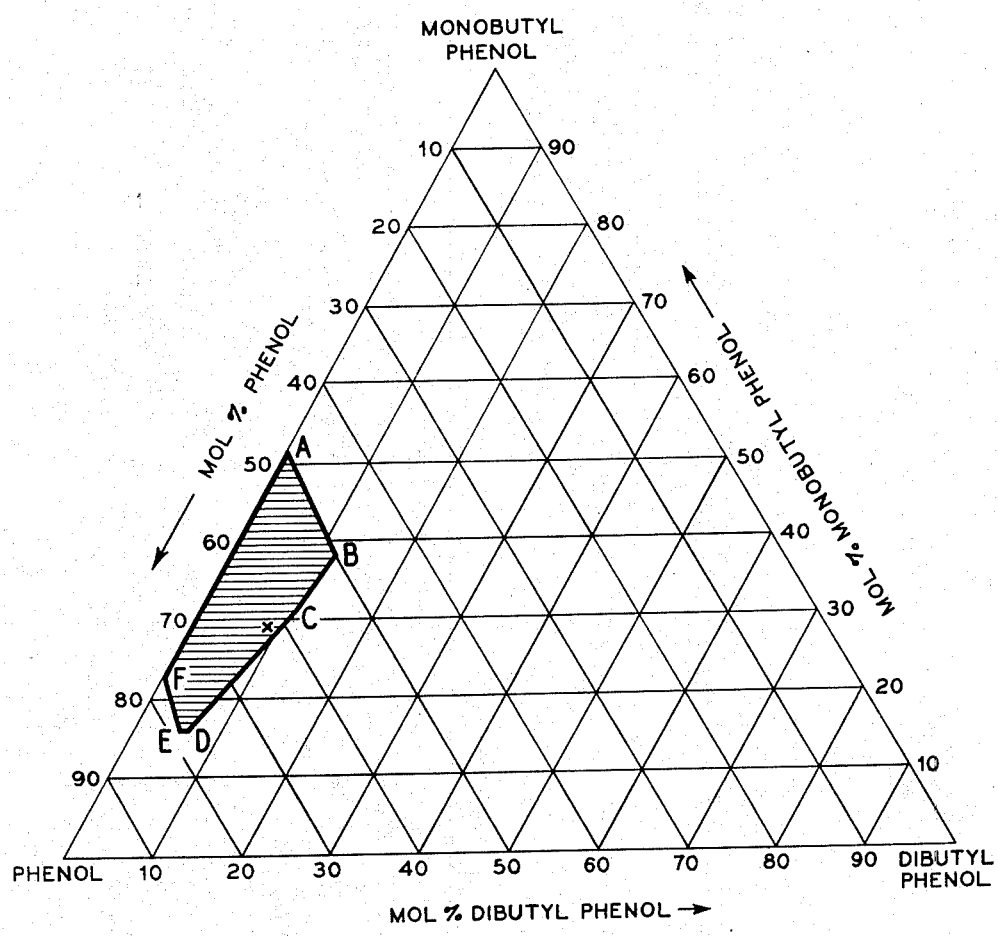
INVENTORS
LANNING P. RANKIN
CHARLES J. SEILER
BY *D.C.Harrison*
ATTORNEY Patented Apr. 13, 1954

2,675,335

UNITED STATES PATENT OFFICE 2,675,335

THERMOSETTING LAMINATING COMPOSITION FROM FORMALDEHYDE CONDENSED WITH MIXTURE OF PHENOL, MONOBUTYL PHENOL, AND DIBUTYL PHENOL

Lanning P. Rankin, Millington, and Charles J. Seiler, Bloomfield, N. J., assignors, by mesne assignments, to Union Carbide and Carbon Corporation, a corporation of New York Application May 22, 1948, Serial No. 28,624

3 Claims. (Cl. 154—43)

The present invention relates to thermosetting compositions for the production of laminated articles, and more particularly, to thermosetting resinous condensation products of formaldehyde and mixtures of phenol and butyl substituted phenols.

Heretofore thermosetting resins useful for the manufacture of laminated articles have been prepared by reacting formaldehyde in molar excess with monohydric phenols such as phenol, the cresols and meta-xylenol in the presence of alkaline catalysts. The reaction is interrupted at the "A" stage to obtain fusible heat-reactive resins soluble in solvents such as alcohols, ketones and aromatic hydrocarbons to produce varnishes of suitable viscosity and solids content for impregnating paper, woven organic or inorganic fabrics, wood and other material useful in laminate construction. The impregnated material is dried at elevated temperatures to remove volatile matter and to advance or partially heat harden the resin, then stacked in layers of the required number of plies and the stack subjected to heat and pressure in a laminating press to consolidate the individual plies into a solid mass and convert the resin binder to the infusible and insoluble "C" stage.

Laminated paper material containing as the binder meta-cresol or xylenol formaldehyde resins exhibit superior resistance to chemicals and have better electrical and mechanical properties than laminates containing phenol-formaldehyde resin. The supply of meta-xylenol as well as the cresols is too limited however to fulfill the demand for superior laminates. Unsubstituted phenol ($C_6H_5OH$) is presently cheaper and more available, but when used in admixture with the aforedescribed methyl substituted phenols for reaction with formaldehyde in attempts to extend the supply of the methyl substituted phenols, modified resins are obtained lacking the superior electrical and mechanical properties for laminate constructions characteristic of unmodified cresol and xylenol resins.

It has now been found that laminates having excellent electrical properties and resistance to water and superior to those containing thermosetting phenol formaldehyde resin as the impregnant and binder are obtained when the thermosetting resin is one prepared by condensing more than a molar quantity and up to about 1.8 mols of formaldehyde with a molar quantity of a phenolic mixture comprising phenol and monobutyl phenol and preferably some minor amount of dibutyl phenol, the proportion of phenol to butyl substituted phenols in said molar quantity being such that the total active positions on the phenolic nuclei in said molar quantity is essentially between 2.3 and 2.8. Suitable monobutyl phenols are those free from other substituents and having two nuclear unsubstituted reactive positions, ortho, ortho, or ortho, para) and similarly the dibutyl phenol is also free from other substituents and has one unsubstituted ortho or para reactive position. The butyl groups of the monobutyl and dibutyl phenols may be normal, iso, secondary or tertiary.

Suitable phenolic mixtures include those containing per mol of phenol itself from 0.2 to about 1 mol of monobutyl substituted phenol and those containing per mol of phenol itself from 0.2 to about 1.0 mol of butyl substituted phenols consisting of monobutyl phenol and dibutyl phenol, the latter being present in proportion not in excess of about 0.35 mol per mol of monobutyl phenol.

In the accompanying drawing molar phenolic mixtures useful in the practice of the present invention are shown in the shaded portion of a ternary graph. The values shown are the mol fraction quantities of phenol, monobutyl phenol and dibutyl phenol in a phenolic mixture for condensation with more than a molar equivalent of formaldehyde. As an illustration of the use of the diagram, the X appearing in the polygon ABCDEF represents the phenolic mixture condensed with formaldehyde in Example 1.

It has been further found that phenolic mixtures of still narrower molar percent range react with formaldehyde yielding thermosetting resins productive of laminates equivalent to and even superior in some respects to those made from meta-cresol or meta-xylenol formaldehyde resins. Such phenolic mixtures contain per mol of phenol itself from 0.04 to 0.20 mol of ortho monobutyl phenol, from 0.30 to 0.50 mol of para monobutyl phenol and from 0.07 to 0.14 mol of dibutyl phenol but not exceeding about 0.35 mol per mol of monobutyl phenols.

The monobutyl phenols of the aforedescribed molar mixtures can consist of either para or ortho substituted monobutyl phenols or a mixture of both. Mixtures of ortho and para substituted butyl phenols are preferred however, because they yield laminating resins having better water resistance and retention of electrical properties under prolonged exposure to humid conditions.

The presence of dibutyl phenol in the molar mixture is highly desirable because its reaction products with formaldehyde and the other phenols in the phenolic mixture internally plasticize the resins in the thermoset condition and contribute high flow characteristics enhancing the penetratiton of the resin into paper and fabric and the bonding together of impregnated plies. The plasticizing effect is retained when the resins are heat-converted to the infusible and insoluble state, enabling paper laminates containing these resins as the binder to be readily postformed. They can also be punched when heated to 135° C. to yield a punched piece passing XXXP grade specifications of The National Electrical Manufacturers' Association (NEMA "Laminated Phenolic Products Standards," publication No. 39–57, Nov. 1939).

Punching properties of the laminates can be further enhanced, permitting punching of the stock at lower temperatures (25° C.–60° C.) by the addition of water-insoluble thermoplastic materials such as polyvinyl acetate, cellulose acetate, and ethyl cellulose to organic solvent solutions of the resins. These materials are compatible with the resins of the present invention in amounts by weight up to 30% and more, and in contrast to the phenolic laminating resins of the prior art, the thermoplastic substances remain compatible and homogeneous therein after heat-conversion of the resin. The addition of such thermoplastic substances to the resins of the present invention decreases to some extent the resistance of the laminates to aqueous sodium hydroxide solutions and diminishes the electrical properties on exposure to water.

Rosin can also be added homogeneously to the resins of the present invention in amounts up to 30% by weight of the phenolic resin and its presence is desirable because it enhances hot punchability and electrical properties such as power factor, insulation resistance, and particularly arc resistance which may average up to ten times that of conventional phenol formaldehyde laminates.

For optimum properties in the laminates, particularly electrical and also water resistance, it has been found that the addition of water in compatible amounts to the solutions of these resins in water-soluble organic solvents, such as methyl, ethyl, and propyl alcohols or ketones such as acetone and ethyl methyl ketone is effective in securing better impregnation of the resin into paper and other cellulosic fibrous materials employed as plies in laminate constructions with attendant superior electrical properties in the laminates. Addition of water up to 10% by weight of the resin in solution in a water miscible organic solvent does not result in appreciable gelling or viscosity increase of the varnishes on storage before use, providing the varnishes are stored at temperatures below 30° C. Under such storage conditions the varnishes are stable for periods up to three months. At higher temperatures the storage life of the water-containing varnishes before use is less than a month. Alternatively, water up to about 15% by weight of the resin or even to the limit of compatibility can be added to the varnishes immediately prior to impregnating the cellulosic material. Water containing varnishes of resins prepared with higher concentration of para substituted monobutyl phenol than the ortho isomer remain homogeneous on storage for a greater length of time.

The manufacturing procedure of the improved resins comprises condensing, preferably under alkaline conditions, the molar mixture of phenols with a molar excess (1.1 to 1.8 mols) of formaldehyde or its polymers, for example formalin, paraformaldehyde or trioxane, or a formaldehyde engendering compound, such as hexamethylenetetramine. The alkaline catalysts suitable for promoting the reaction are those hitherto conventionally employed in the manufacture of heat-hardenable phenol-aldehyde resins. The condensation reaction is interrupted upon formation of "A" stage liquid to solid heat reactive resins. Conventional acid catalysts for resinification may also be used for initial reaction, and then completing the reaction with alkaline catalysts. Alternatively, the various phenols in the mixture may be progressively individually reacted with formaldehyde in the presence of alkaline catalysts to favor formation of methylol substituted phenols, initiating the reaction with the most slowly reacting phenol, namely dibutyl phenol, and then adding successively the faster reacting phenols, and concluding with the addition of phenol itself.

The "A" stage resins may be dehydrated by distillation or decantation, and the catalysts neutralized before dissolving them in solvents to produce varnishes. Coloring matter such as pigments and soluble dyes may be admixed with the varnishes.

The following examples illustrate the manufacture of the laminating varnishes and the superior laminate constructions made therefrom. It is to be understood that in the examples all parts are by weight unless otherwise stated.

EXAMPLE 1

A resin still fitted with reflux condenser and a stirrer was charged with 47.8 parts phenol; 15.5 parts ortho tertiary butyl phenol, 20.8 parts para tertiary butyl phenol, 15.5 parts ditertiary butyl phenol, 64.0 parts formalin (37%) and 4.5 parts hexamethylenetetramine as catalyst. The charge was refluxed at 100° C. and at atmospheric pressure for two hours, yielding a viscous liquid "A" stage resin. The resin was dehydrated to a water content of 3 to 5 percent by heating to 100° under diminished pressure and the reaction was then continued by heating until the resin when tested had a gelation speed of between 180 and 300 seconds on a hot plate at 160° C. Ethyl alcohol was added to the resin in quantity to yield a solution of 58 to 60% resin content and a viscosity between 250 and 500 centipoises. A 10 mil rag paper was impregnated with the varnish and then passed through a heated drying chamber to evaporate the solvent and other volatile matter. The dried sheets were cut to size and sufficient of them assembled in a laminating press to yield a final laminate of 0.125 inch thickness. The assembled sheets were subjected to a molding pressure of 2000 p. s. i. and molding temperature of 170° C. for 40 minutes to yield a satisfactory dense hard laminate containing 48–50% resin content.

EXAMPLE 2

A varnish prepared as in Example 1 was diluted with water in amount equal to 15% of the resin weight. Rag paper was impregnated with the water diluted varnish, dried and then formed by molding under heat and pressure into laminates according to the conditions described in Example 1 for the water-free laminating varnish.

EXAMPLE 3

A varnish was prepared as in Example 1 and rosin in amount equal to 25% of the phenolic resin weight was added to the varnish to form a homogeneous solution. The solution was used to impregnate rag paper, and the impregnated paper after drying was formed into satisfactory laminates in the same manner as described in Example 1.

EXAMPLE 4

The rosin modified varnish of Example 3 was further modified by the addition thereto of water in amount equal to 15% of the weight of the phenolic resin. Rag paper was impregnated with the water-diluted varnish, dried, and then laminated by the application of heat and pressure in the same manner described in the previous examples.

The laminates of Examples 1 to 4 were subjected to various mechanical and electrical tests. The test results are shown in Table I and particularly illustrate the pronounced improvements obtained in electrical properties as well as resistance to water and aqueous sodium hydroxide solution by diluting the varnishes with water prior to impregnation.

Table I

| Test | Example 1 | Example 2 | Example 3 | Example 4 |
|---|---|---|---|---|
| Percent Water Absorption, 24 hr./25° C. | 0.90 | 0.50 | 0.67 | 0.46 |
| Percent Caustic Absorption, 10% solution/24 hr./25° C. | 4-5 | 1.20 | 4.00 | 2.30 |
| Flexural Strength Condition C (p. s. i.) | 27,000 | 26,000 | 25,000 | 26,000 |
| Impact Strength, Izod, ft. lbs. per inch notch | 0.85 | 0.55 | 0.66 | 0.53 |
| Power Factor—million cycles: | | | | |
| Condition A | .0350 | .0320 | .0355 | .0332 |
| Condition B | .0315 | .0305 | .0313 | .0304 |
| Condition D | .0360 | .0319 | .0350 | .0325 |
| Tensile Strength (p. s. i.), Condition C | 20,000 | 20,000 | 18,000 | 20,000 |
| Bonding Strength (p. s. i.) | 1,500 | 1,400 | 1,370 | 1,300 |

The conditioning procedures for the laminates prior to testing were as follows:

Condition A—No prior treatment
Condition B—24 hours in oven at 100° C. prior to testing
Condition C—Humidity conditioning—96 hours at 25° C. and 70% relative humidity
Condition D—Immersion conditioning in distilled water—immersed for 24 hours at 25° C. prior to testing.

EXAMPLE 5

A resin still equipped with an agitator and reflux column was charged with a mixture of phenols consisting of 74.4 parts phenol, 20.15 parts ortho tertiary butyl phenol, 40.3 parts para tertiary butyl phenol and 20.15 parts ditertiary butyl phenol, 123.0 parts formalin (37%) and 0.755 part barium hydroxide and 5.4 parts hexamethylenetetramine as alkaline catalysts. The charge was reacted by refluxing at atmospheric pressure and at a temperature of 100° C. for about two hours. The resultant viscous liquid resin was dehydrated at a temperature of 100° C. and under diminished pressure to a water content of 5 percent. The resin was further reacted by heating at 100° C. until a test sample of the resin exhibited a gelation time of about 100 seconds when heated to 160° C. on a hot plate. The resin was then dissolved in sufficient ethyl alcohol to yield a varnish of 60% resin solids and a viscosity of 350 centipoises.

Paper base sheets were impregnated with the varnish of Example 5 so as to contain in the heat and pressure cured laminate a resin content of 48 to 50%. The paper used was a 10 mil rag paper. The laminates were molded by subjecting the impregnated sheets after drying to a 3.6% volatile content to a pressure of 2000 p. s. i. and a mold temperature of 160° C. for one hour. The laminates were tested according to Joint Army Navy Specifications JAN-P-13. The test results are shown in Table II where comparison is made with a composite maximum set of standards for a laminate satisfactory in every respect to meet all the requirements of any of the three major classes of laminates (classes H, M and E) contemplated by the JAN-P-13 specifications.

Table II

| | Composite Standard for all classes of laminates | Laminates prepared with varnish of Example 5 |
|---|---|---|
| Water absorption (percent), 24 hrs. at 25° C. | 0.90 | 0.50 |
| Dielectric Strength (volts/mil.): | | |
| Condition C (⊥ to lam.) | 400 | 600 |
| Condition D (⊥ to lam.) | 135 | 570 |
| Condition C (= to lam.) | 50 | >60 |
| Power Factor: | | |
| Condition B, 1 KC | 0.06 | .0087 |
| Condition D, 1 KC | 0.08 | .0157 |
| Condition B, 1 MC | 0.04 | .0295 |
| Condition D, 1 MC | 0.05 | .0314 |
| Dielectric Constant: | | |
| Condition B, 1 MC | 5.3 | 4.22 |
| Condition D, 1 MC | 5.6 | 4.32 |
| Loss Factor: | | |
| Condition B, 1 MC | 0.20 | .123 |
| Condition D, 1 MC | 0.24 | .136 |
| Insulation Resistance: | | |
| Condition C (= to lam.) | 250 | >5,000 |
| Condition D (= to lam.) | 15 | |
| Impact Strength (ft. lb./in. notch): | | |
| Condition B, Edgewise | 0.80 | 0.55 |
| Condition D, Edgewise | 0.85 | 0.60 |
| Flexural Strength, Condition C (p. s. i.) | 19,500 | 26,000 |
| Tensile Strength, Condition C (p. s. i.) | 12,000 | 20,000 |
| Bonding Strength, Condition C (lbs.) | 900 | 1,400 |
| Compressive Strength (Flatwise): | | |
| Condition C (p. s. i) | 36,000 | 46,000 |
| Condition C (edgewise) | 22,000 | 30,000 |

It will be noted that the laminates prepared with the varnish of Example 5 met every requirement with the exception of impact strength. However, by reducing resin content of the laminates to about 40% mechanical properties are benefited and the impact strength is improved sufficiently to meet the specification. The test results in Table III are on laminates prepared with rag paper and impregnated to 40% resin content with the varnish of Example 5.

Table III

| | |
|---|---|
| Water absorption (per cent), 24 hours at 25° C. | 0.70 |
| Caustic absorption (per cent), 24 hours in 10% solution | 2.03 |
| Power factor, 1 MC | 0.0319 |
| Dielectric constant, 1 MC | 4.29 |
| Loss factor | 0.137 |
| Power factor, 1 MC (after submersion in water for 24 hours at 25° C.) | .0338 |
| Impact strength (edgewise) (ft. lbs. per inch notch) | 0.80 |
| Bonding strength (lbs.) | 1,190 |
| Flexural strength (p. s. i.) | 28,900 |
| Hardness (Rockwell M. scale) | 117 |

EXAMPLE 6

A resin still equipped with a reflux condenser and an agitator was charged with 68 parts phenol, 2 parts ortho tertiary butyl phenol, 24 parts para tertiary butyl phenol, 6 parts ditertiary butyl phenol, 91 parts formalin (37%) and 3.6 parts concentrated aqueous ammonium hydroxide or 1.0 part triethylamine as alkaline catalyst. The charge was reacted by heating under atmospheric pressure refluxing conditions for 90 minutes at a temperature of 100° C. yielding a viscous liquid resin. The resin was dehydrated at a temperature of 100° C. to a water content of 4 percent and further reacted until a test sample exhibited a gel time of 200 seconds at 160° C. The resin was then dissolved in sufficient ethyl alcohol to form a solution having a resin solids content of 58% and a viscosity of 380 centipoises. Rag paper was impregnated with the varnish to produce a sheet of 50% resin content. After drying of the sheets, laminates were prepared in the same manner described in Example 1. Tabulated in Table IV are the properties of the laminates.

*Table IV*

| | |
|---|---|
| Percent water absorption, 24 hours at 25° C. | 0.42 |
| Per cent caustic absorption, 24 hours in 10% aqueous solution at 25° C. | 2.60 |
| Power factor, 1 MC: | |
|    Condition A | .0367 |
|    Condition D | .0367 |

EXAMPLE 7

A heat-hardenable viscous liquid resin was prepared by charging a resin still with 37 parts phenol, 2 parts ortho tertiary butyl phenol, 43 parts para tertiary butyl phenol, 18 parts ditertiary butyl phenol, 72 parts formalin (37%) and 6.3 parts concentrated aqueous ammonia solution. The charge was refluxed at atmospheric pressure and at 100° C. for 135 minutes yielding a viscous resin which was substantially dehydrated by heating at 100° C. and under diminished pressure. The dehydrated resin was reacted further at 100° C. until a sample taken therefrom gelled in 420 seconds at 160° C. The resin was dissolved in sufficient ethyl alcohol to yield a varnish of 60% resin content. Laminates were prepared by impregnating 10 mil rag paper with the filtered varnish to yield an impregnated sheet of 50% resin content and then molding the sheets into laminate form by heat and pressure. In Table V are tabulated the properties of these laminates.

*Table V*

| | |
|---|---|
| Percent water absorption, 24 hours at 25° C. | 0.37% |
| Percent caustic absorption, 24 hours in 10% aqueous solution at 25° C. | 2.2% |
| Power factor, 1 MC: | |
|    Condition A | .0329 |
|    Condition D | .0333 |
| Dielectric strength, S/S | 544 volts/mil. |
| Impact strength (edgewise) ft. lbs. per inch notch | 0.70 |

EXAMPLE 8

A laminating varnish prepared by reacting formaldehyde with phenol and secondary butyl phenols was made by charging a resin still with 50.3 parts phenol, 21.9 parts ortho secondary monobutyl phenol, 6.9 parts para secondary monobutyl phenol, 20.9 parts di-secondary butyl phenol, 63 parts formalin (37%) and 4.5 parts hexamethylenetetramine as catalyst. The charge was reacted by heating to 100° C. and refluxing at this temperature and under atmospheric pressure for two hours, yielding a viscous resin. The resin was dehydrated by heating to 105° C. under diminished pressure. The dehydrated resin was dissolved in sufficient ethyl alcohol to yield a varnish of 60% resin content. The varnish had a viscosity of 450 centipoises and gelled within seven minutes when heated to 160° C. Paper laminates were prepared by impregnating 10 mil rag paper with the varnish to yield an impregnated sheet of 50% resin content. The paper after drying was laminated by subjecting it to a molding temperature of 160° C. and a pressure of 2000 p. s. i. for 60 minutes. In Table VI are tabulated the properties of the laminate thus prepared.

*Table VI*

| | |
|---|---|
| Flexural strength (p. s. i.) | 24,170 |
| Impact strength (ft. lbs. per inch notch) | 0.57 |
| Bonding strength | 1,036 |
| Power factor, 1 MC | 0.317 |
| Power factor, 1 MC (after submersion in water for 24 hours at 25° C.) | 0.328 |
| D. C. resistivity at 30° C. (megohm cms.) | $1.10 \times 10^7$ |

In the examples thus far given the laminates were molded at pressures averaging about 2000 p. s. i. Lower molding pressures can be used however, for instance, 300 p. s. i. Laminates made with conventional phenolic resins at such low molding pressures are mechanically and electrically weaker than laminates molded under high pressures. Moreover with conventional thermosetting varnishes it has been necessary to laminate the individual plies while in a wet condition to obtain sufficient flow and bonding of the resin. This is not necessary with varnishes of the present invention since after impregnating plies with them, the impregnated sheets can be dried to a tack free condition and stacked for storage without loss of mold flow characteristics. As shown in Table VII paper base laminates impregnated to 50% resin content with the varnish described in Example 5 had substantially the same water resistance and electrical properties when molded at 300 p. s. i. as at 1000 p. s. i.

*Table VII*

| Test | Molding Pressure | | |
|---|---|---|---|
| | 300 p. s. i. | 600 p. s. i. | 1,000 p. s. i. |
| Water Absorption (percent) 24 hours at 25° C. | 0.60 | 0.721 | 0.499 |
| Water Absorption (percent), 48 hours at 25° C. | 0.750 | 0.840 | 0.627 |
| Caustic Absorption (percent), 24 hours in 10% solution | 1.59 | 1.60 | 1.55 |
| Compression Strength (p. s. i.) | 39,400 | 39,300 | |
| Hardness M scale | 117 | 116 | 117 |
| Flexural Strength (p. s. i.) | 28,100 | 27,000 | 25,400 |
| Power Factor (1 MC), Condition B | 0.0273 | 0.0284 | 0.0261 |
| Dielectric Constant (1 MC) | 4.05 | 4.13 | 4.06 |
| Power Factor (1 MC), after submersion | 0.0286 | 0.0297 | 0.0277 |

EXAMPLE 9

Laminates were prepared by impregnating canvas duck cloth (8 oz. weight) with the varnish of Example 5. The impregnated sheets after drying had a 55% resin content and were laminated together in a press held for one hour at a molding pressure of 2000 p. s. i. and temperature of 160° C. The resultant laminates were tested to determine their suitability in meeting the JAN-P-13 requirements for fabric base material suitable for the five grades M-3, M-4, MH-1, EM-1 and EM-2. The composite requirements of these five grades are listed in the first column of Table VIII and in the next column are the test results of the laminates prepared as described in this example. It will be observed that other than in impact strength and water absorption, the laminates are well within the composite requirements of the group.

Table VIII

|  | Composite Requirements | Example 9 |
|---|---|---|
| Water Absorption (percent) 24 hours at 25° C | 1.00 | 1.20 |
| Dielectric Strength, volts/mil, Condition C (1 to 1am) | 250 | 320 |
| Power Factor: | | |
| Condition B (1 MC) | 0.05 | 0.037 |
| Condition D (1 MC) | 0.075 | 0.075 |
| Dielectric Constant: | | |
| Condition B (1 MC) | 5.3 | 4.2 |
| Condition D (1 MC) | 5.6 | 4.9 |
| Flexural Strength, edgewise, Condition C (p. s. i.) | 19,000 | 24,000 |
| Impact Strength, ft. lbs./in. notch: | | |
| Condition B (edgewise) | 3.00 | 1.80 |
| Condition D (edgewise) | 4.10 | 2.00 |
| Compressive Strength, edgewise, Condition C | 23,600 | 26,000 |
| Bonding Strength: | | |
| Condition C (lbs.) | 1,700 | 1,750 |
| Condition D | 1,700 | 1,400 |

EXAMPLE 10

A thermosetting varnish was prepared as described in Example 5 and polyvinyl acetate having a softening point of 77° C. by a modified ball and ring method was added as a 55% solution in acetone to the varnish in amount equal to 30 per cent of the total solids. A homogeneous solution was obtained and was used to impregnate paper to a 40 percent resin content. The impregnated paper after drying was laminated by being subjected to a molding pressure of 2000 p. s. i. and molding temperature of 160° C. for 60 minutes to produce a translucent laminate of 0.125 inch thickness. The laminate had good impact strength (0.88 ft. lbs./sq. in.) and gave clean cut punched items when punched by a complex radio tube base die at room temperature and up to 60° C.

When the same amount of polyvinyl acetate was added to a conventional phenol-formaldehyde laminating varnish a compatible solution was obtained. However upon laminating paper impregnated with the mixture, the resultant laminates were milky white in appearance which indicated incompatibility of the polyvinyl acetate with the thermoset phenolic resin.

The thermosetting resins of the present invention are soluble in aromatic hydrocarbon solvents for instance toluol and xylol. They may be further plasticized by the addition to the resins in the fusible state of such recognized phenolic resin plasticizers as alkyl abietates, alkyl phthalates, tricresyl phosphate and the like. Upon heat-conversion of the resin, the plasticizers are strongly retained and do not sweat out even when used in larger quantities than is possible with unmodified phenol formaldehyde laminating resins.

What is claimed is:

1. A thermosetting resin being the alkaline-catalyzed, "A" stage condensation product of between 1.1 and 1.8 mols of formaldehyde with a molar quantity of a phenolic mixture consisting of phenol itself, ortho substituted monobutyl phenol, para substituted monobutyl phenol and dibutyl phenol having one active position, said molar quantity containing per mol of phenol itself from 0.04 to 0.20 mol of ortho substituted monobutyl phenol, from 0.30 to 0.50 mol of para substituted monobutyl phenol and from 0.07 to 0.14 mol of dibutyl substituted phenol, the latter not exceeding about 0.35 mol per mol of monobutyl phenols.

2. A varnish composition useful as a binder for the preparation of laminated material comprising in solution in a volatile organic solvent an alkaline-catalyzed "A" stage condensation product of between 1.1 and 1.8 mols of formaldehyde with a molar quantity of a phenolic mixture consisting of phenol itself, ortho substituted monobutyl phenol, para substituted monobutyl phenol and dibutyl phenol having one active position, said molar quantity containing per mol of phenol itself from 0.04 to 0.20 mol of ortho substituted monobutyl phenol, from 0.30 to 0.50 mol of para substituted monobutyl phenol and from 0.07 to 0.14 mol of dibutyl substituted phenol, the latter not exceeding about 0.35 mol per mol of monobutyl phenols.

3. Laminated article comprising fibrous sheet material and a thermoset resinous binder, said binder being the resinous, alkaline-catalyzed, condensation product of between 1.1 and 1.8 mols of formaldehyde with a molar quantity of a phenolic mixture consisting of phenol itself, ortho substituted monobutyl phenol, para substituted monobutyl phenol and dibutyl phenol having one active position, said molar quantity containing per mol of phenol itself from 0.04 to 0.20 mol of ortho substituted monobutyl phenol, from 0.30 to 0.50 mol of para substituted monobutyl phenol and from 0.07 to 0.14 mol of dibutyl substituted phenol, the latter not exceeding about 0.35 mol per mol of monobutyl phenols.

References Cited in the file of this patent

UNITED STATES PATENTS

| Number | Name | Date |
|---|---|---|
| 2,121,642 | Rosenblum | June 21, 1938 |
| 2,139,081 | Honel | Dec. 6, 1938 |
| 2,218,373 | Alexander | Oct. 15, 1940 |
| 2,233,875 | Schmidt et al. | Mar. 4, 1941 |
| 2,345,357 | Powers | Mar. 28, 1944 |

FOREIGN PATENTS

| Number | Country | Date |
|---|---|---|
| 340,989 | Germany | Sept. 20, 1921 |
| 416,476 | Great Britain | Sept. 10, 1934 |

OTHER REFERENCES

Carswell: Phenoplasts, pages 12 and 99, Interscience Publishers (1947).

D'Alelio: Experimental Plastics and Synthetic Resins, pages 18–21, John Wiley and Sons, New York.

Baekeland: Journ. of Ind. and Eng. Chem., March 1909, pages 149–161.